US009366273B2

United States Patent
Pitney et al.

(10) Patent No.: US 9,366,273 B2
(45) Date of Patent: Jun. 14, 2016

(54) VAPOR RECOVERY LINE FLOW METER

(71) Applicants: Paul Pitney, Wildwood, MO (US);
David Medin, Marion, IA (US);
Thomas Hamilton, Cedar Rapids, IA (US); Mitchell Thomas, Cedar Rapids, IA (US)

(72) Inventors: Paul Pitney, Wildwood, MO (US);
David Medin, Marion, IA (US);
Thomas Hamilton, Cedar Rapids, IA (US); Mitchell Thomas, Cedar Rapids, IA (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 13/986,422

(22) Filed: Apr. 30, 2013

(65) Prior Publication Data

US 2013/0327430 A1 Dec. 12, 2013

Related U.S. Application Data

(60) Provisional application No. 61/687,826, filed on May 2, 2012.

(51) Int. Cl.
F15D 1/00 (2006.01)
G01F 1/708 (2006.01)

(52) U.S. Cl.
CPC ............... F15D 1/00 (2013.01); G01F 1/7082 (2013.01); Y10T 137/2087 (2015.04)

(58) Field of Classification Search
CPC ...................................................... F15D 1/00
USPC ........... 141/45, 46, 59, 95, 301, 302; 137/808
See application file for complete search history.

(56) References Cited

U.S. PATENT DOCUMENTS

| 3,203,237 | A | * | 8/1965 | Ogren | 73/861.32 |
|---|---|---|---|---|---|
| 3,680,375 | A | | 8/1972 | Joy et al. | |
| 3,796,096 | A | * | 3/1974 | Sielaff et al. | 73/861.24 |
| 3,878,716 | A | * | 4/1975 | Asada | 73/861.24 |
| 4,031,757 | A | | 6/1977 | Colton | |
| 4,088,020 | A | * | 5/1978 | Sgourakes et al. | 73/861.24 |
| 4,240,299 | A | | 12/1980 | Joy et al. | |
| 4,297,898 | A | * | 11/1981 | Herzl | 73/861.22 |
| 4,312,235 | A | * | 1/1982 | Daigle | 73/861.18 |
| 4,312,236 | A | | 1/1982 | Mahany et al. | |
| 4,312,237 | A | | 1/1982 | Thorne et al. | |
| 4,424,714 | A | | 1/1984 | Johnson | |
| 4,433,574 | A | * | 2/1984 | Williams et al. | 73/200 |
| 4,434,668 | A | * | 3/1984 | Shinoda et al. | 73/861.22 |
| 4,437,349 | A | | 3/1984 | Joy | |
| 4,574,643 | A | * | 3/1986 | Scott et al. | 327/104 |
| 4,891,990 | A | * | 1/1990 | Khalifa et al. | 73/861.24 |
| 5,635,650 | A | * | 6/1997 | Ito | 73/861.21 |

(Continued)

Primary Examiner — Timothy L Maust
Assistant Examiner — Andrew Schmid
(74) Attorney, Agent, or Firm — Paul M. Denk

(57) ABSTRACT

An improvement in a vapor recovery line in the form of a vortex shedding flow meter installable within such vapor recovery line to monitor the flow rate of vapor being returned through the vapor recovery line, such flow meter including a housing having an inlet flange with an associated inlet connectable to the upstream portion of the vapor recovery line, an outlet flange with an outlet connectable to the downstream portion of the vapor recovery line, a housing for a passageway extending between the inlet and outlet, with a vortex strut extending into the passageway nearer the outlet to generate shed flow vortices and a transmitter-receiver transducer pair positioned nearer the outlet to subject the shed vortices to a sonic beam to effect modulation thereof, and an electronics package within an electronic housing portion for determining from such modulation the flow rate of the vapor passing through the vapor recovery line.

8 Claims, 6 Drawing Sheets

(56) References Cited

U.S. PATENT DOCUMENTS

| | | | |
|---|---|---|---|
| 5,678,614 A * | 10/1997 | Grantham | 141/59 |
| 6,053,053 A * | 4/2000 | Huotari | 73/861.22 |
| 6,220,103 B1 * | 4/2001 | Miller et al. | 73/861.22 |
| 6,244,310 B1 * | 6/2001 | Rowland et al. | 141/59 |
| 6,360,789 B2 | 3/2002 | Walker et al. | |
| 6,543,297 B1 * | 4/2003 | Kleven | 73/861.52 |
| 6,748,811 B1 * | 6/2004 | Iwanaga et al. | 73/861.27 |
| 6,810,922 B1 | 11/2004 | Grantham | |
| 6,912,918 B1 * | 7/2005 | Lynnworth et al. | 73/861.26 |
| 7,174,926 B1 | 2/2007 | Grantham | |
| 7,335,164 B2 * | 2/2008 | Mace et al. | 600/532 |
| 7,509,982 B2 | 3/2009 | Grantham | |
| 2005/0210998 A1 * | 9/2005 | Dimarco et al. | 73/861.22 |
| 2005/0210999 A1 * | 9/2005 | Sylvia et al. | 73/861.29 |
| 2007/0163361 A1 * | 7/2007 | Lewicke | 73/861.22 |
| 2009/0049926 A1 * | 2/2009 | Mattar et al. | 73/861.24 |
| 2011/0219885 A1 * | 9/2011 | Shumilov et al. | 73/861.24 |
| 2013/0327430 A1 * | 12/2013 | Pitney et al. | 137/808 |

* cited by examiner

VAPOR RECOVERY LINE FLOW METER

CROSS REFERENCE TO RELATED APPLICATION

This non-provisional patent application claims priority to the provisional patent application having Ser. No. 61/687,826, filed on May 2, 2012.

FIELD OF THE INVENTION

The present invention is directed to a vapor recovery system, in general, and more specifically to the vapor recovery line between the fuel dispensing nozzle and the fuel storage tank, and particularly to an improvement in the vapor recovery line in the form of a vapor recovery line flow meter installable within such vapor recovery line to monitor the flow and flow rate of fuel vapor therethrough.

BACKGROUND OF THE INVENTION

Over the years and in accordance with anti-pollution regulations and clean air standards, vapor recovery systems have become important features of fuel dispensing systems. Many fueling systems now include vapor recovery systems that include vapor recovery lines disposed between the fuel dispensing nozzles of fuel dispensing systems and the fuel storage tanks, typically disposed underground, from which storage tank fuel is drawn for dispensing through the fuel pump and the fuel dispensing nozzle. The systems are typically designed to provide for the recovery of fuel vapors and the return of such vapors through the vapor recovery line to the fuel storage tank.

It is considered desirable to be able to monitor the flow and flow rate of the fuel vapor being returned to the fuel storage tank through the vapor recovery line. Prior devices that might serve such purpose have suffered from a variety of shortcomings, as a consequence of which there has remained a desire for an improvement in the vapor recovery line that will allow the flow and flow rate of fuel vapor being returned to the fuel storage tank to be monitored.

To address such desire, an improvement in the vapor recovery line has now been developed that includes a vortex shedding vapor recovery line flow meter that is installable between an upstream portion and a downstream portion of the vapor recovery line.

In recent years it has been found that the flow and flow rate of fluids can be measured by utilizing vortex shedding techniques and by subjecting the resultant vortices to sonic transmissions. In general, a vortex type meter makes use of a non-streamlined strut or other vortex generating device in the flow stream. As the flow passes such strut or other vortex generating device, vortices are formed and are shed behind the strut or other vortex generating device, with the number of vortices shed per unit of time being proportional to the flow rate. Typically, an ultrasonic beam is then positioned downstream in the flow stream a short distance and such beam intercepts the vortices as they pass, resulting in detectable modulation of the beam signal.

Descriptions of several such flow meters and related components and discussions of the techniques associated therewith may be found in Joy et al U.S. Pat. No. 3,680,375; Colton U.S. Pat. No. 4,031,757; Joy et al U.S. Pat. No. 4,240,299; Mahanny et al U.S. Pat. No. 4,312,236; Thorne et al U.S. Pat. No. 4,312,237; Johnson U.S. Pat. No. 4,424,714; and Joy U.S. Pat. No. 4,437,349.

Such vortex shedding flow meters typically effect sine wave type outputs, with the frequency of the sine wave being approximately proportional to the volumetric flow rate of the gas or other liquid and independent of the composition of the gas or liquid.

Applicant has determined that such techniques are adaptable for use in flow meters that are installable within vapor recovery lines and has now developed an improvement in a vapor recovery line that includes a vortex shedding flow meter that facilitates the measurement of flow and the flow rate of vapors within the vapor recovery line and that is conveniently comprised within a housing particularly adapted and configured for installation within such vapor recovery lines.

SUMMARY OF THE INVENTION

The subject vapor recovery line improvement includes a vapor line flow meter that is installable between an upstream portion and a downstream portion of the vapor recovery line and employs vortex shedding and sonic sensing techniques for determining the flow and flow rate of the vapors through the vapor recovery line. Such flow meter includes a housing having an inlet connectable to the upstream portion of the vapor recovery line, an outlet connectable to the downstream portion of the vapor recovery line, and a passageway therebetween through which the vapors being returned to the fuel storage tank are passed. In one preferred form the inlet is associated with an upstream flange that is matably engageable with a complementary flange construction installed on the upstream portion of the vapor recovery line and the outlet is associated with a downstream flange that is matably engageable with a complementary flange construction installed on the downstream portion of the vapor recovery line. The passageway that extends between the inlet and outlet is preferably of a generally cylindrical form and of generally comparable size to the vapor recovery line, and the housing further includes an electronics housing portion or compartment adjacent to the passageway between the inlet and outlet flanges.

A vortex generating device, preferably in the form of a vortex strut, is positioned nearer the outlet portion extending into the passageway and the flow path of the vapors therethrough in order to disrupt the free flow and to generate flow vortices as the vapor in the passageway flows from the inlet towards the outlet of the flow meter.

Downstream from the vortex strut, nearer the outlet, a transducer housing portion is positioned generally transverse, but not necessarily at right angles, to the cylindrical passageway, and a transmitter-receiver transducer pair is installed thereat to subject the generated vortices to a sonic beam, typically in the ultrasonic range, as the vortices pass by the transducer pair. Generally, as the vortices travel through the ultrasonic beam they interact therewith to effect a modulation of the carrier wave.

The resulting signal is processed in accordance with an electronics package installed within the electronics housing portion to determine an accurate flow rate of the vapor through the vapor recovery line. As is explained in several of the patents identified hereinabove, the number of vortices shed downstream per unit of time is proportional to the flow rate, as a consequence of which a precise flow velocity can be determined by counting the vortices.

Preferably, to ensure reliable and accurate low-flow performance, the vortex strut shall be appropriately sized to minimize flow restriction, while maximizing dynamic range of the instrument.

Strut housing, with an outer access and containment cap may optionally be provided along the cylindrical passageway to facilitate maintenance on or replacement of the vortex strut as may be required. Similar access and containment caps may also be provided for the transducer housing portion to permit easy access to the transducers for servicing.

The flow meter improvement as described herein is of a rugged construction for dependability and, because it does not require movable parts, is highly reliable and can be easily installed within a vapor recovery line at low cost.

DESCRIPTION OF THE PREFERRED EMBODIMENT

In the following discussion, relative to a vapor recovery line or the flow meter hereinafter described, reference to "upstream" is generally intended to refer to a portion closer to the dispensing valve handle and reference to "downstream" is generally intended to refer to a portion closer to the fuel storage tank, unless it is otherwise clear from the discussion that an alternate or other meaning or reference is intended.

Figure 1:
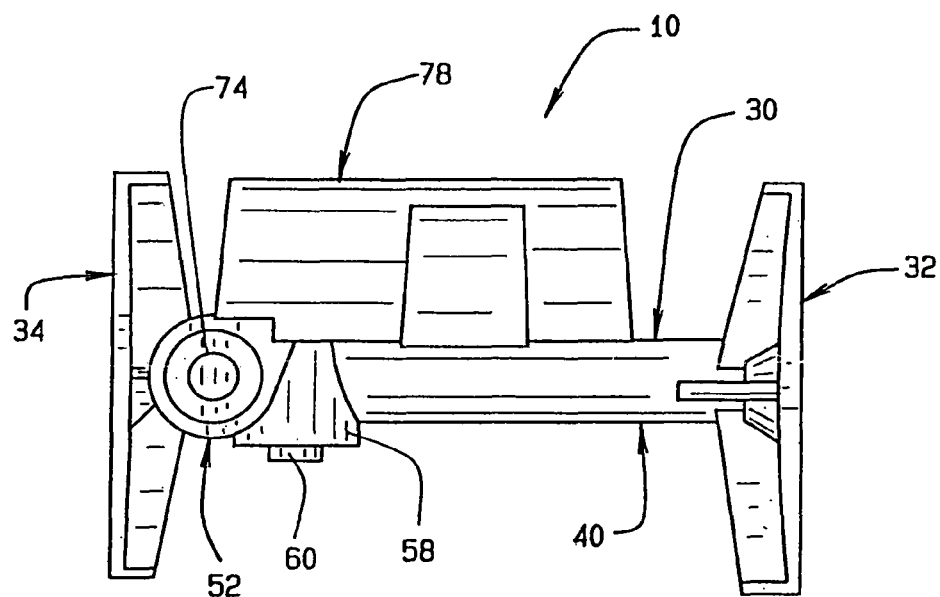
FIG. 1 is side view of a preferred embodiment of a vortex shedding flow meter according to the present invention.
Figures 2, 3:
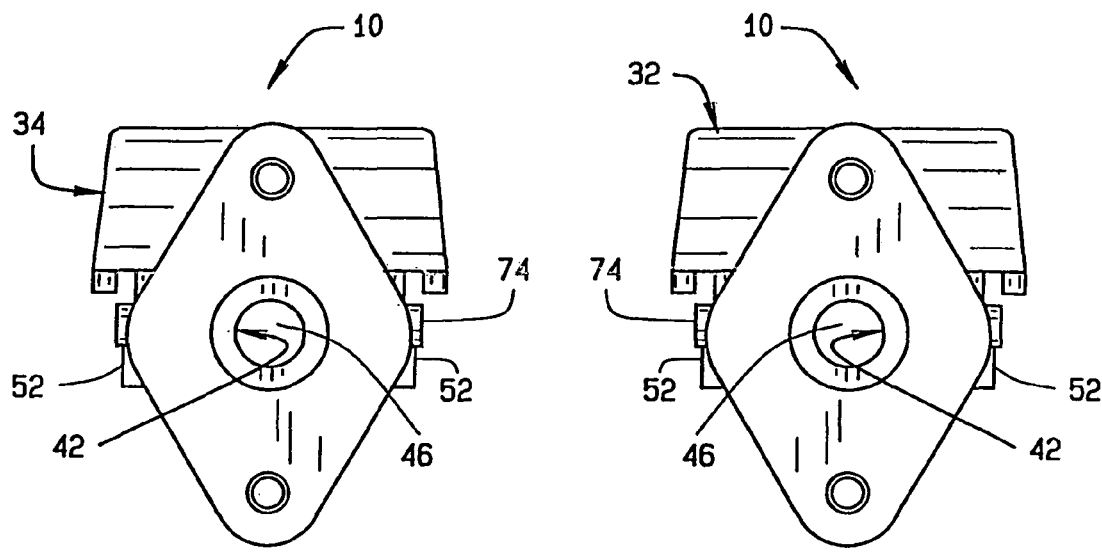
FIG. 2 is an inlet (right end) view of the flow meter of FIG. 1.
FIG. 3 is an outlet (left end) view of the flow meter of FIG. 1.
Figure 4:
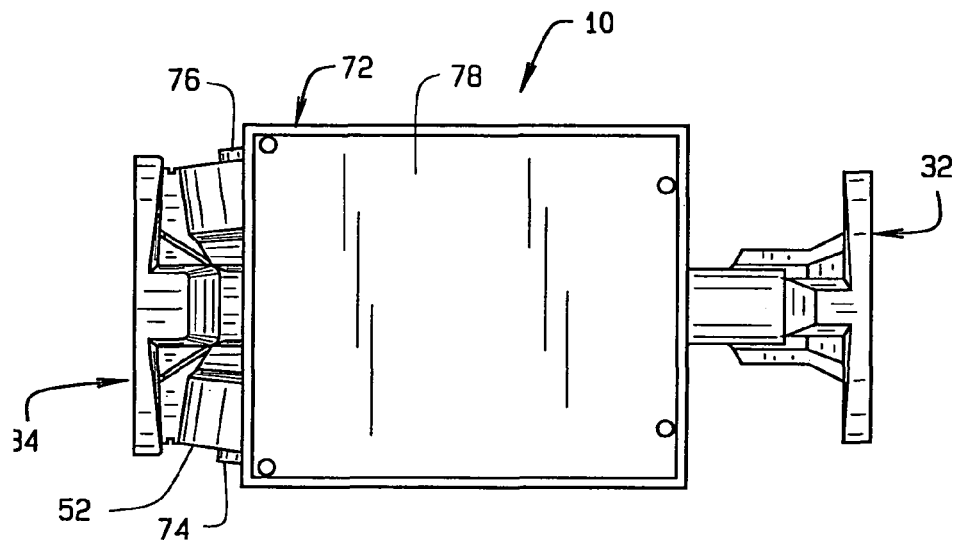
FIG. 4 is a topside view of the flow meter of FIG. 1.
Figure 5:
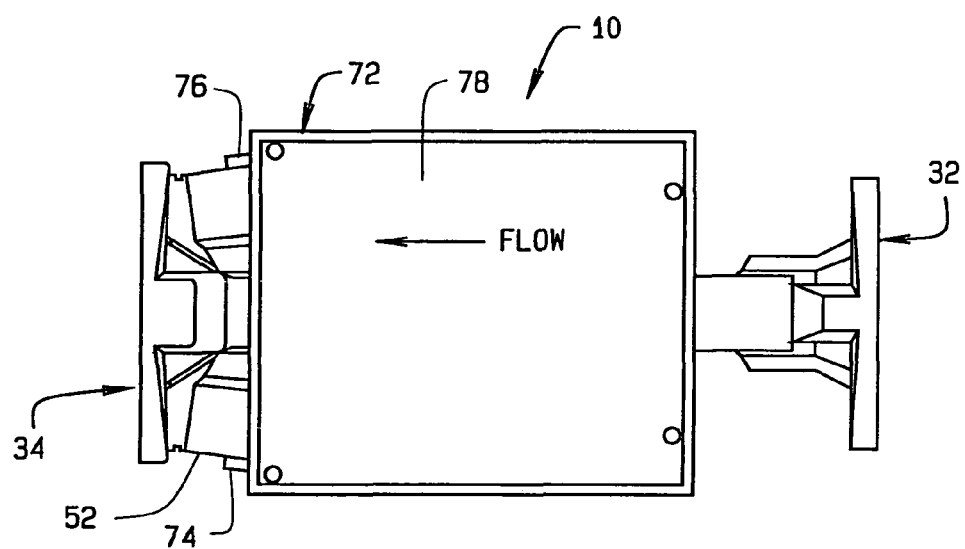
FIG. 5 is a topside view, line drawing, of the flow meter of FIG. 1.
Figure 6:
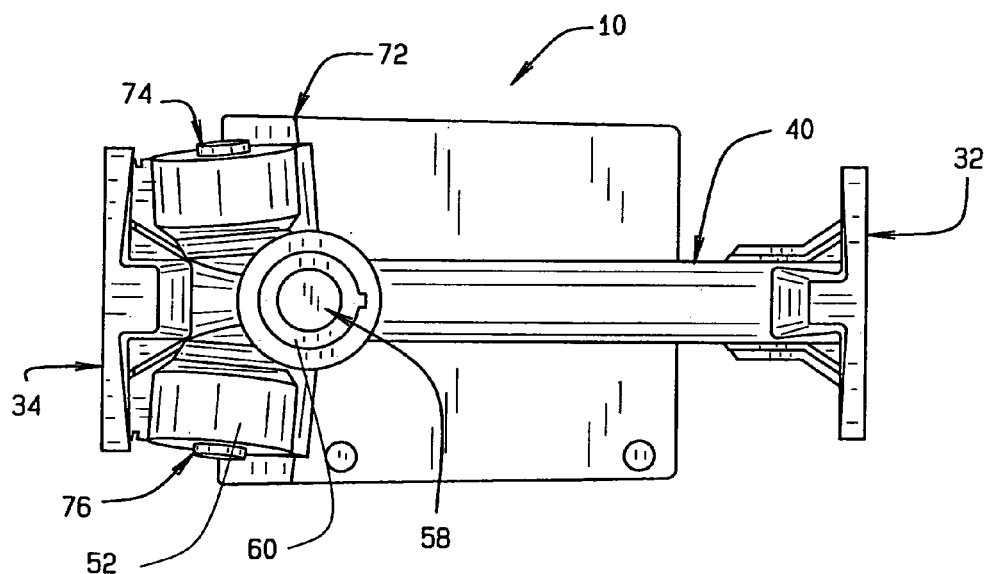
FIG. 6 is a bottom view of the flow meter of FIG. 1.
Figure 7:
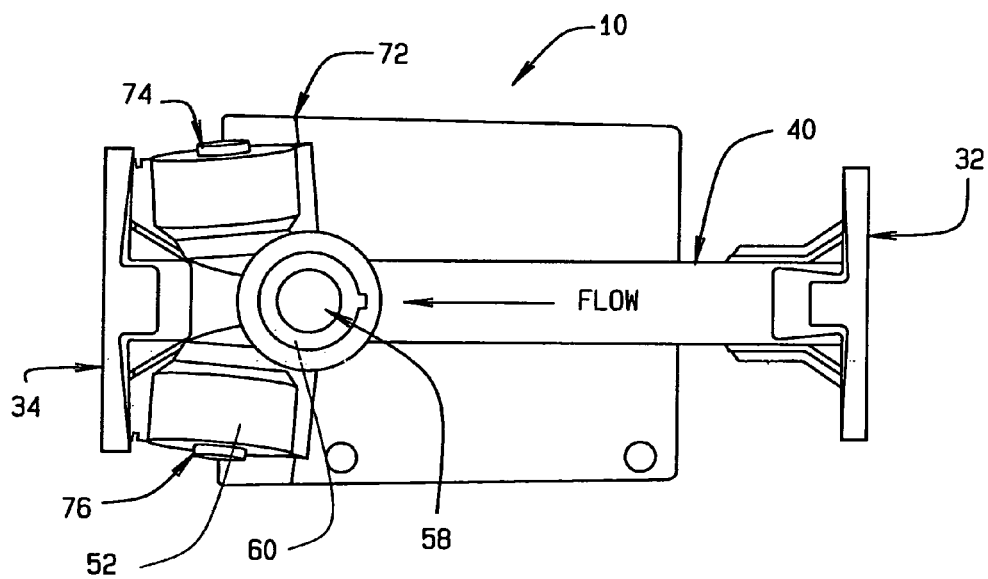
FIG. 7 is a bottom view, line drawing, of the flow meter of FIG. 1.
Figure 8:
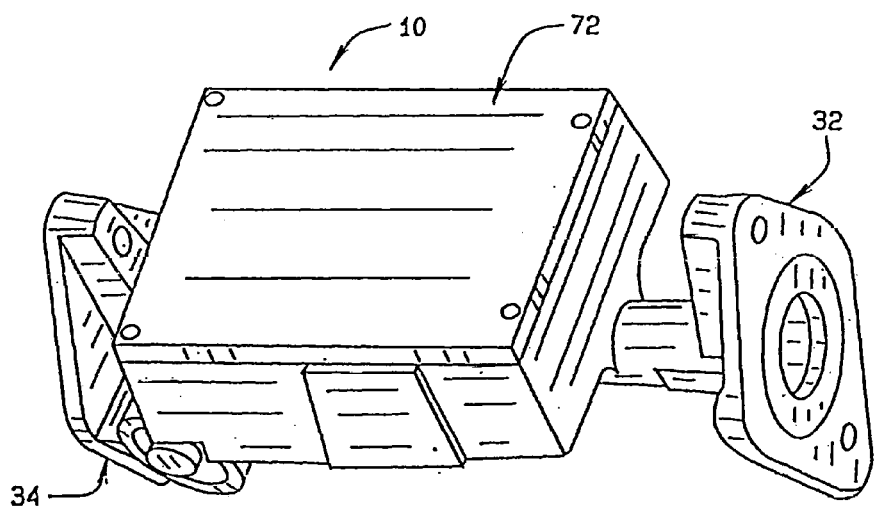
FIG. 8 is a perspective view, from the inlet end, of the flow meter of FIG. 1.
Figure 9:
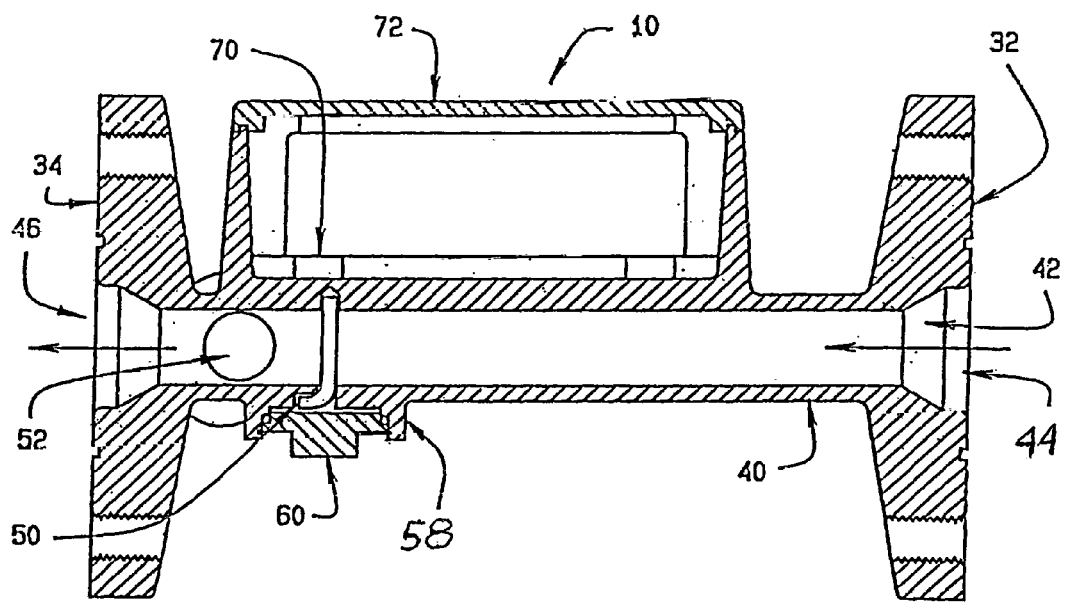
FIG. 9 is a cutaway side view of the flow meter of FIG. 1.
Figure 10:
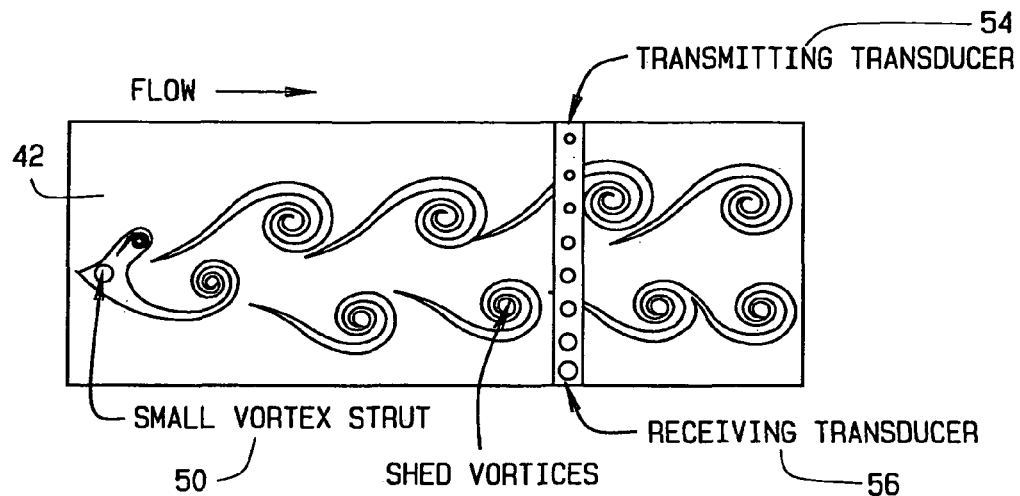
FIG. 10 is a representational view of a vortex shedding flow meter such as the flow meter of FIG. 1 depicting the generation of vortices as vapor flows past the vapor strut and the interaction of the generated vortices with the ultrasonic beam of the transducers.
Figure 11:
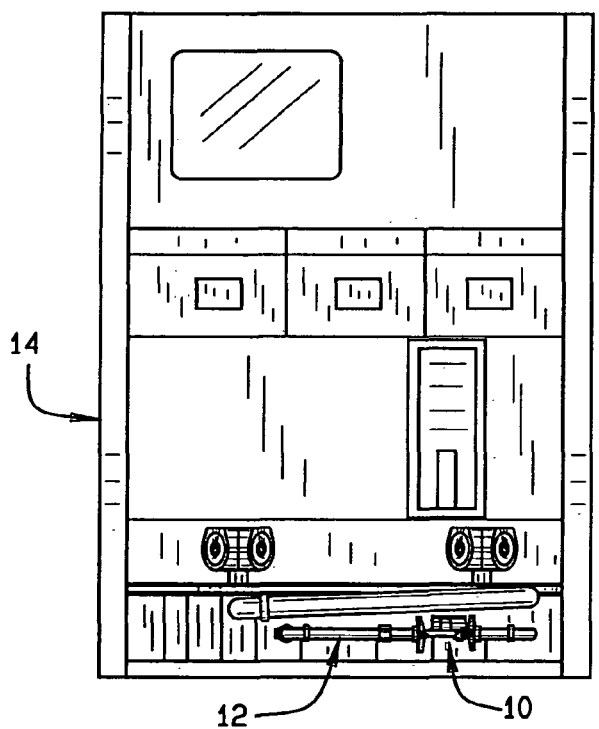
FIG. 11 is a view of a gasoline pump station at a service station with the flow meter of FIG. 1 installed in the vapor recovery line of such gasoline pump station at the location as indicated.
Figure 12:
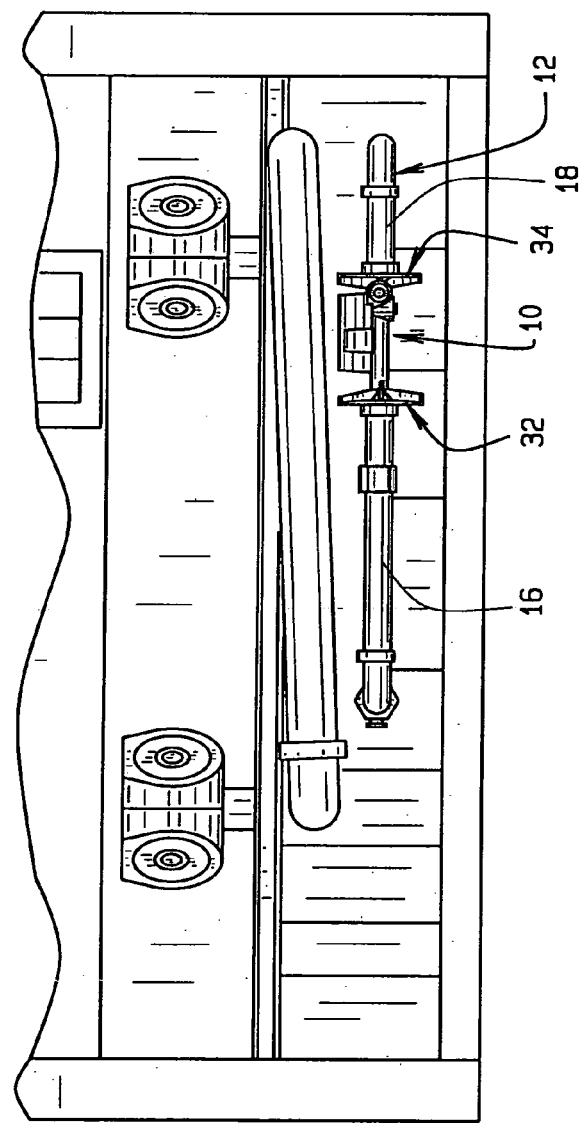
FIG. 12 is a closer view of the installed flow meter of FIG. 11.

In light thereof, with reference now to the drawings wherein like numbers refer to generally like items, FIGS. 1-10 show a flow meter 10 according to the present invention and FIGS. 11-12 show such flow meter 10 as installed in the vapor recovery line 12 associated with a gasoline pump station 14 of a service station, wherein the upstream portion 16 of the vapor recovery line 12 is connectable to the dispensing valve handle of the gasoline pump station 14 and the downstream portion 18 of the vapor recovery line 12 is connectable to the underground storage tank of such service station.

Flow meter 10 includes a housing 30 that includes an inlet flange 32 configured to be connectable to a complementary flange on the upstream portion of the vapor recovery line 12 and an outlet flange 34 configured to be connectable to a complementary flange on the downstream portions of the vapor recovery line 12. The complementary flanges may typically be conveniently connected to one another by means of nuts and bolts or by various other suitable connection techniques or methods, and gaskets or other sealing materials may be employed therewith to prevent leakage.

A generally tubular housing portion 40 extends between flanges 32 and 34 and has a generally cylindrical interior passageway 42 therethrough between inlet 44 and outlet 46. As best shown in FIG. 9, a vortex generating device, such as vortex strut 50, is installed to project into the cylindrical passageway 42 upstream from a transducer housing 52 that is positioned generally transverse, but not necessarily at right angles, to the cylindrical passageway 42. As is depicted in FIG. 10, as vapors flow through the cylindrical passageway 42 and impinge the vortex strut 50, vortices are generated which then flow past transmitting and receiving transducers 54 and 56 installed within the transducer housing 52 to interact with the ultrasonic beam of the transducers. To facilitate access to the vortex strut 50, including for maintenance or servicing or replacement, an access housing 58 with an access cap 60 is provided along the bottom of tubular housing 40.

An electronics package 70 for powering and controlling the transducers and determining the flow rate therefrom is contained within an electronics housing portion 72 extending generally above and along the tubular housing 40.

For convenience in accessing and servicing the transducers 54 and 56 and the electronics package 70, access caps 74 and 76 are provided at the opposite, outer ends of the transducer housing 52 and a lid 78 is provided atop the electronics housing portion 72.

The electronics package 70 includes a flow determination portion that operates to determine from the sonic signals detected by the second transducer, in accordance with known procedures and techniques, including those as discussed and described in greater detail in the various patents as identified hereinabove, incorporated herein by reference thereto, the flow rate of the vapor passing through the vapor recovery line and the flow meter 10 interposed therein. The manners in which such determinations are effected and the particular components utilized in making such determinations may take any suitable forms consistent with the realization of serviceable results.

Depending upon desires of users, the flow meter can also optionally include visual display devices therewith for displaying flow rate information, recording devices for recording such information, and/or communications devices or circuitry for communicating such information to other locations or media, either locally or more distant, which communications devices or circuitry may include hardwired or wireless networks and equipment.

It should be appreciated that, although the preferred flow meter as described hereinabove employs a vortex strut, vortex generating devices of other forms and configurations, including forms such as are described in several of the patents as identified hereinabove, may also be utilized. Similarly, although the preferred flow meter as described hereinabove utilizes an ultrasonic beam for determining flow and flow rate measurements, it should be appreciated that sonic waves within other ranges may also be utilized when appropriate, including acoustic and subsonic waves, so long as the sonic transducers can effectively operate to achieve the desired results.

In light of all the foregoing, it should thus be apparent to those skilled in the art that there has been shown and described an improvement in a vapor recovery line of a fueling system, especially in the provision of a flow meter therein that operates in accordance with vortex shedding techniques and principles and sonic determination of flow rate from the generated vortices and that is particularly adapted and configured to be readily installable in the vapor recovery line. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

We claim:

1. In a vapor recovery line between a fuel dispensing nozzle and a fuel storage tank wherein the vapor recovery line includes an upstream portion nearer the fuel dispensing nozzle, and a downstream portion nearer the fuel storage tank, the improvement comprising:
    a vapor recovery flow meter, including:
    a vapor passing housing, said housing having an inlet flange configured to be matably engageable with a complementary flange on the upstream portion of the vapor recovery line, said housing having an outlet flange configured to be matably engageable with a complementary flange on the downstream portion of the vapor recovery line;
    a generally tubular housing portion extending between said inlet flange and said outlet flange and including a generally cylindrical passageway extending therethrough;
    said inlet flange forming an inlet into the tubular housing on the upstream portion of the vapor recovery line and communicating with the cylindrical passageway through said tubular housing;
    said outlet flange forming an outlet from the downstream portion of the tubular housing and communicating with the cylindrical passageway of the tubular housing to allow the flow of fuel vapors therefrom;
    said inlet flange, outlet flange, and tubular housing forming the vapor passageway between said inlet and outlet of the vapor recovery line;
    a vortex generating device installed within said passageway of the tubular housing whereby the passing of said vapors therethrough impinges upon the vortex generator thereby effecting the creation of vortices of the vapor for detection, said vortex generating device being a vortex strut;
    a first transducer housing formed upon the tubular housing and incorporating a first transducer for directing a sonic signal into and generally across the passageway through which the vapors pass and downstream from the vortex strut, a second transducer housing incorporating a second transducer and for detecting the sonic signals received generally across the passageway through which the vapors pass; and
    whereby passage of the sonic signals through the shedded vapors effects their modulation whereby the sonic signals can detect and determine the flow rate of such passing vapors.

2. The improvement of claim 1 wherein the sonic signal introduced into said passageway is an ultrasonic signal.

3. The improvement of claim 2 wherein said flowmeter further includes;
    an electronics package for powering and controlling said first and second transducers; and
    an electronics housing portion positioned generally above and integral upon said generally tubular housing portion for housing said electronics package.

4. The improvement of claim 3 wherein said electronics package includes a flow rate determination portion responsive to said detection of ultrasonic signals by said second transducer to determine the flow rate of vapor through the vapor recovery line.

5. The improvement of claim 4, wherein said electronic housing portion includes a cover which can be removed for servicing of the electronics package contained therein.

6. The improvement of claim 1, wherein the first and second transducer housings each incorporate a removable access cap that allows for access into the transducer housings for servicing of their contained transducers.

7. The improvement of claim 1, wherein the vortex housing includes an access cap that is removable for allowing servicing of the vortex strut.

8. The improvement of claim 1, said vortex generating device is installed within said formed passageway nearer said outlet than said inlet.

* * * * *